United States Patent

[11] 3,581,899

| [72] | Inventor | Raymond E. Hunter<br>Lomita, Calif. |
|---|---|---|
| [21] | Appl. No | 26,666 |
| [22] | Filed | Apr. 8, 1970 |
| [45] | Patented | June 1, 1971 |
| [73] | Assignee | Ocean Design Engineering Corporation<br>Long Beach, Calif. |

[54] APPARATUS FOR SEPARATING OIL FROM WATER SURFACE
6 Claims, 3 Drawing Figs.

| [52] | U.S. Cl. | 210/242,<br>210/DIG 21 |
|---|---|---|
| [51] | Int. Cl. | B01d 15/02 |
| [50] | Field of Search | 210/33, 39,<br>40, 242, DIG 21 |

[56] References Cited
UNITED STATES PATENTS

| 2,470,418 | 5/1949 | Verner | 210/DIG 21 |
|---|---|---|---|
| 3,265,616 | 8/1966 | Wyllie et al. | 210/DIG 21 |
| 3,314,540 | 4/1967 | Lane | 210/DIG 21 |
| 3,334,042 | 10/1967 | Teitsma | 210/40X |
| 3,348,690 | 10/1967 | Cornelisson | 210/DIG 21 |
| 3,426,902 | 2/1969 | Kilpert et al. | 210/DIG 21 |
| 3,487,927 | 2/1970 | Yahnke | 210/DIG 21 |

*Primary Examiner*—Reuben Friedman
*Assistant Examiner*—Thomas G. Wise
*Attorney*—Fulwider, Patton, Rieber, Lee & Utecht ABSTRACT: An apparatus for separating oil from a water surface by distributing many small buoyant bodies of oil absorbent material upon such surface, continuously lifting such bodies from the surface, treating the bodies to remove the absorbed oil, and again distributing the bodies upon the surface for reuse. The apparatus preferably includes booms for gathering the distributed bodies of absorbent material toward a conveyor which lifts the bodies upwardly. The booms are articulated and include floats so that the booms rise and fall with any wave action of the water, such as would exist in the unprotected waters of the open sea. The apparatus also preferably includes a system for compressing the oil from the bodies, and thereafter dropping the bodies onto the water surface for recycling.

INVENTOR.
RAYMOND E. HUNTER 3,581,899

APPARATUS FOR SEPARATING OIL FROM WATER SURFACE

BACKGROUND OF THE INVENTION

1. Field of the Invention

The present invention relates to an apparatus for separating normally liquid hydrocarbon compounds from a liquid of higher specific gravity and higher free energy and, more particularly, to such an apparatus for separating oil from a water surface.

2. Description of the Prior Art

Spills of liquid hydrocarbon compounds such as petroleum, crude oil, fuel oil, and the like present a serious water pollution problem and various means have been proposed to quickly remove such spills before contamination of the sea bottom and adjacent shoreline occurs. Such spill occur both in protected waters such as harbors, and also occur in offshore or unprotected waters. Spills in harbors result principally from oil transfer operations, industrial waste discharges, pipeline breaks, collisions, and the like, and generally amount to volumes in the order of 100 barrels. Spills in offshore waters normally result from collisions or grounding of tankers and merchant vessels, or as a result of malfunctions of an offshore oil rig. Although less frequent, such offshore spills are often very large. The offshore type of oil spill is particularly difficult to deal with because of the wave action which interferes both with efficient consolidation or confinement of the oil slick to a small area, and also with the mechanical separation of the oil from the water surface.

Various means have been employed in an effort to clean up spilled oil, including the use of chemicals to cause sinking or dispersion of the oil, and also including the distribution of absorbent material on the surface of the slick. In addition, burning of the slick has been attempted, as well as skimming of the surface oil by means of rotating cylinders, suction devices, and the like.

Each of these methods of the prior art has serious limitations. Chemically caused sinking or dispersion of the oil pollutes the water and the harbor or sea bottom. Burning or incineration is objectionable because of atmospheric pollution, and because of the difficulty of maintaining the oil slick at a temperature high enough to sustain combustion. The skimming process, which is capable of removing relatively large quantities of oil at a comparatively high rate, undesirably requires large and expensive settling or centrifuging devices which depend for efficient operation upon a relatively precise orientation of the weir or other skimming device relative to the thickness of the surface film of oil. Wave action in unprotected waters makes this type of operation very impractical. This is also true of that class of devices which utilize moving drums, belts, or discs disposed at the water surface and moved through the oil film for continuous coating or impregnation with the oil. Such devices must be precisely aligned with the film of oil in order to absorb or carry away a high proportion of oil rather than water.

In summary, the systems of the prior art lack one or more of the following desirable characteristics: high oil recovery rate, minimum inclusion of water with the removed oil, efficient oil removal in the presence of water motion or wave action, relatively inexpensive, and easy to deploy and maintain.

SUMMARY

According to the present invention, an apparatus is provided for separating normally liquid hydrocarbon compounds from a liquid of higher specific gravity, particularly for separating oil from a water surface, such separation being accomplished by distributing resiliently flexible bodies of open cell material such as foam material upon the water surface. The foam material floats upon the water surface so that it is not affected by the water motion or wave action of the water surface. and the pore or cell size of the cavities in the foam material are selected such that the material has an affinity for oil rather than water. This preferential affinity is sufficiently great that the bits of foam material rapidly absorb oil, while rejecting water. Consequently, the foam material can be used on both continuous and discontinuous oil spills. According to the present method and apparatus, the oil-saturated bits or bodies of foam material are lifted from the water surface, compressed to extract the entrapped oil, and then redistributed upon the water surface for reuse.

The recycling of the open cell or foam material greatly reduces the amount of such material needed for an oil cleanup operation. Moreover, the recycling tends to improve the efficiency of oil absorption in that the oil residue remaining after initial use of the bodies of foam material enhances the capacity of the foam material to absorb oil on reuse, apparently because of an improved wetting effect.

As will be seen, the free-floating character of the bodies of foam material optimizes their oil/water recovery ratio, since the bodies are not inadvertently plunged below the surface of the water where the increased hydrostatic head would have the effect of intruding water into the pores instead of the desired oil.

The particular apparatus utilized includes booms which have the effect of crowding or gathering the distributed open cell bodies of foam material toward a collection area, the apparatus being operative to raise or lift the oil-saturated bodies of material onto a floating platform where the bodies are compressed to extract the oil, the relatively oil-free bodies then being redistributed by the apparatus upon the water surface for recycling.

Other objects and features of the invention will become apparent from consideration of the following description taken in connection with the accompanying drawing.

DESCRIPTION OF THE PREFERRED EMBODIMENT

Figure 1:
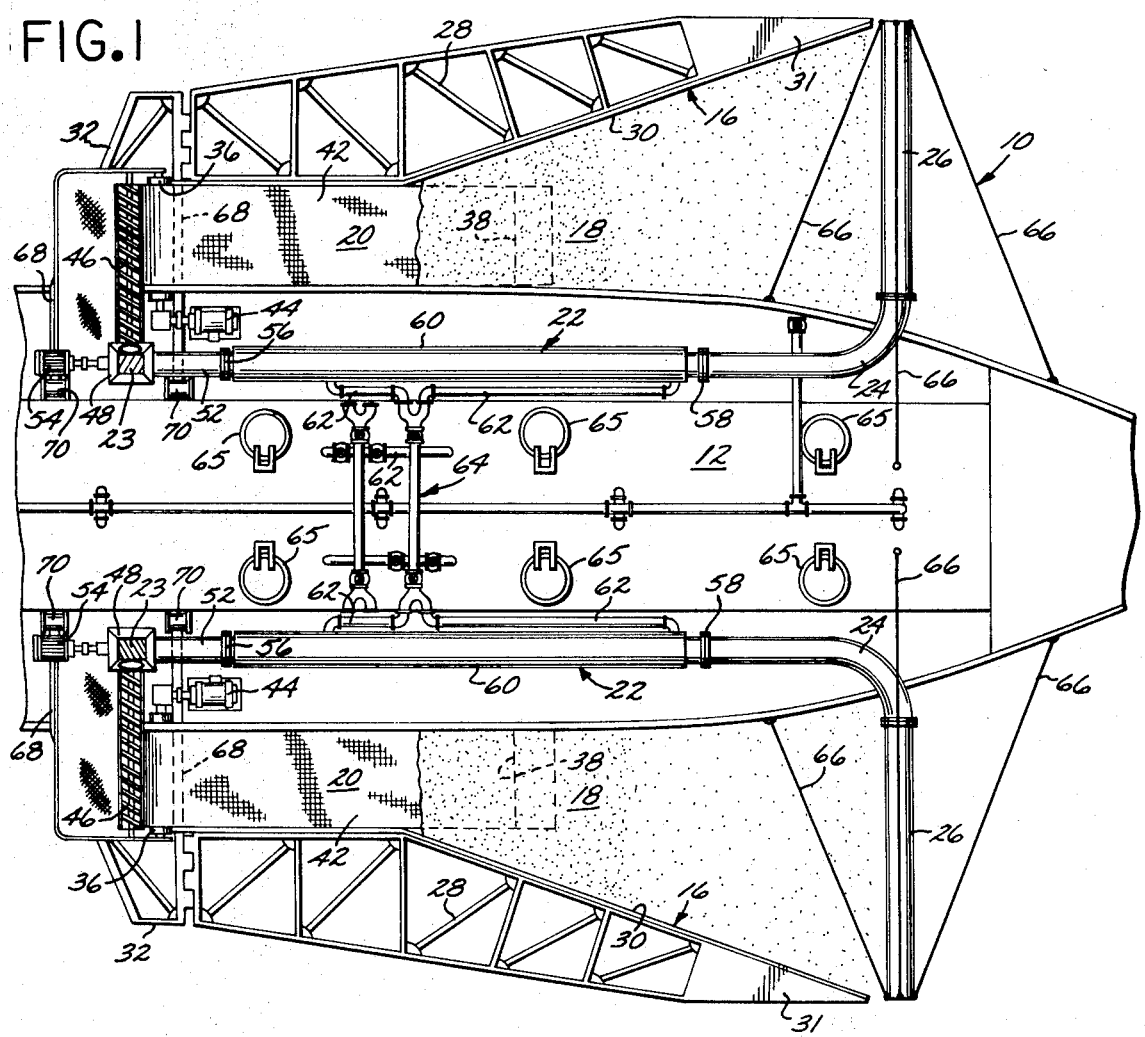
FIG. 1 is a partial plan view of apparatus according to the present invention, the floating platform in the particular embodiment illustrated being a conventional oil tanker.
Figure 2:
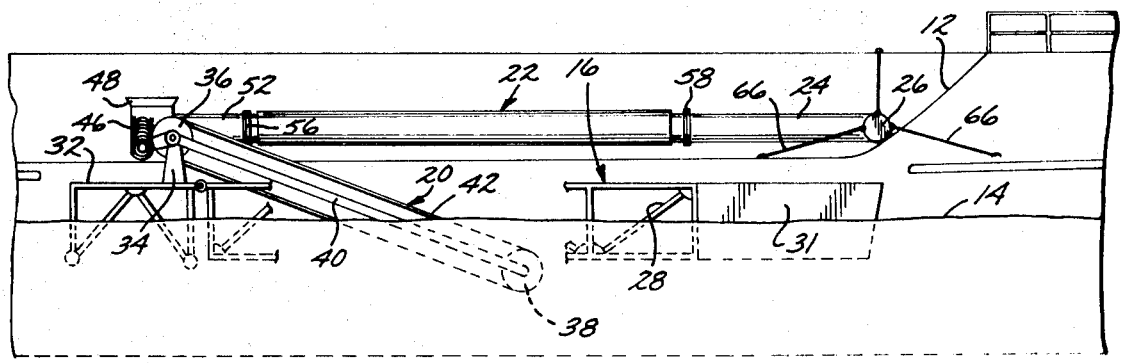
FIG. 2 is a side elevational view of the apparatus of FIG. 1.

Referring now to the drawings, and particularly to FIGS. 1 and 2, there is illustrated an apparatus 10 according to the present invention and comprising, generally, a floating platform 12 in the form of a vessel such as a tanker or oiler having, for example, a 500,000 gallon capacity. The tanker or oiler configuration is merely exemplary, and various forms of floating platform may be utilized, depending upon the particular application. For example, where the apparatus 10 is to be utilized in protected waters, a relatively inexpensive pontoon platform driven by outboard motors could be utilized. Also, where the platform 12 is to be used in unprotected or offshore waters, various forms of vessel could be utilized, so long as they inherently include an oil storage capacity, or could be fitted with tanks to provide such an oil storage capacity. The platform 12 may be towed over the water surface 14 by a separate vessel, but preferably it is self-propelled by conventional propulsion means such as marine engines (not shown).

The apparatus 10 also includes a pair of elongated harvesting booms 16 located on opposite sides of the platform 12, and each defining with the hull of the platform 12 a collection area 18; a pair of conveyors 20 adjacent the booms 16, respectively; a pair of helical screw compressors 22 adjacent the conveyors 20 for squeezing or extracting oil from material passing through the compressors 22, as will be seen; and recycling means including tubes 24 for carrying previously compressed materials to a pair of distributors 26 located on opposite sides of the platform 12 adjacent the forward extremities of the boom 16.

Each boom 16 comprises an elongated pipe truss structure 28 having a generally vertically oriented inner surface formed of a plate 30. The forward or free extremity of each boom 16 includes a float 31 to support the boom 16 at an appropriate operating draft and to cause the boom 16 to move up and down with the wave action of the water surface 14.

Each boom 16 on each side of the platform 12 is associated with an identical set of components. For brevity only one such set will be described. More particularly, the rearward extremity of each boom 16 is pivotally hinged to a support bracket 32 for movement about a generally horizontal axis. The support bracket 32 rests against the side of the hull of the platform 12 and mounts a roller support 34 which rotatably carries an upper roller 36 of one of the conveyors 20. Each conveyor 20 also includes a lower roller 38 pivotally connected to the upper roller by a pair of elongated side members 40. An endless perforated belt or screen 42 is disposed or trained upon the rollers 36 and 38.

As best viewed in FIG. 1, a motor 44 is mounted upon the deck of the platform 12, and is operative to rotate the upper roller 36 and thereby move the upper portion of the screen 42 in a direction toward the upper roller 36.

A crew conveyor 46 is located at the upper terminus of each conveyor 20 and is operative to laterally transport material from the conveyor screen 42 to a hopper 48 mounted upon the deck of the platform 12.

Material passing into the hopper 48 is engaged by a rearward portion of the longitudinally extending helical screw conveyor or compressor 22 which extends through the hopper 48. The forward portion of the compressor 22 is enclosed within a conduit 52 which is made in two sections removably connected together at flanges 56 by bolts or the like (not shown). The opposite end of the longer one of the conduit sections is also removably connected at flanges 58 to the adjacent extremity of the associated recycling tube 24.

Each screw compressor 22 is formed with a decreasing pitch from the hopper end 23 in a forward direction, the pitch reduction being approximately 2 to 1, so that any material being conveyed by the compressor 22 is squeezed or compressed. The compressor 22 is labeled "SEPARATOR" in FIG. 3.

Oil or similar material extracted from such material then passes through a plurality of holes or openings (not shown) in the underside of that portion of the conduit 52 located between the flanges 56 and 58, and is collected within a jacket 60 which surrounds this portion of the conduit 52. The collected oil is then drawn off by pipes 62 which open to the interior of the jacket 60 and which are coupled at their opposite ends to a suitable pump network 64 of pipes, valves, and pumps. The particular details of the network 64 are not important to the present invention and therefore will not be described in detail, it being sufficient to not that the network 64 if effective to withdraw oil from the jackets 60 of the compressors 20, and convey such oil to one or more of the several oil bunkers 65 of the vessel or platform 12. In the diagrammatic showing of FIG. 3 the network 64 is denoted simply as "PUMP," and the bunkers 65 are labeled "HOLDING TANK."

Each recycling tube 24 extends forwardly and then outwardly, where it is connected to the inner extremity of a laterally extending distributor 26. Each distributor 26 is in the form of an elongated cylindrical conduit closed at its outer end and including an axially extending, slot (not shown) in its underside so that material passing into each distributor 26 is released to fall upon the water surface 14. The slot (not shown) is preferably progressively larger in an outward or lateral direction to more uniformly distribute the conveyed material over the water surface 14 immediately below the distributor 26.

The distributor 26 is suitably secured to the platform 12 by a plurality of guy wires 66.

Although the platform 12 could have been especially designed for use with the present apparatus 10, a conventional tanker or oiler is used. Consequently, the booms 16 and conveyors 20 are made for replaceable mounting to the platform and, because the apparatus 10 is intended for use in unprotected waters such as the open sea, the booms 16 and conveyors 20 are also made inwardly pivotable to a stowage position upon the deck of the vessel or platform 12. For this purpose, each support bracket 32 includes a pair of elongated beams 68 which are pivotally mounted at their inner extremities to a pair of trunnions 70 fixed to the deck of the platform 12. The motor 54, hopper 48, and rearmost section of the conduit 52 are carried by the beams 68. By decoupling or unbolting the flanges 56, the associated boom 16, conveyor 20, motor 54, hopper 48, and rearmost section of the conduit 52 can be pivoted upwardly and inwardly to stow the pivoting components inwardly of the exterior hull surface. In addition, the flanges 58 can be decoupled and the guy wires 66 manipulated so as to move the distributor 26 into position over the deck for stowage. The reverse of this procedure would be followed in order to deploy these components for usual operation of the apparatus 10.

Figure 3:
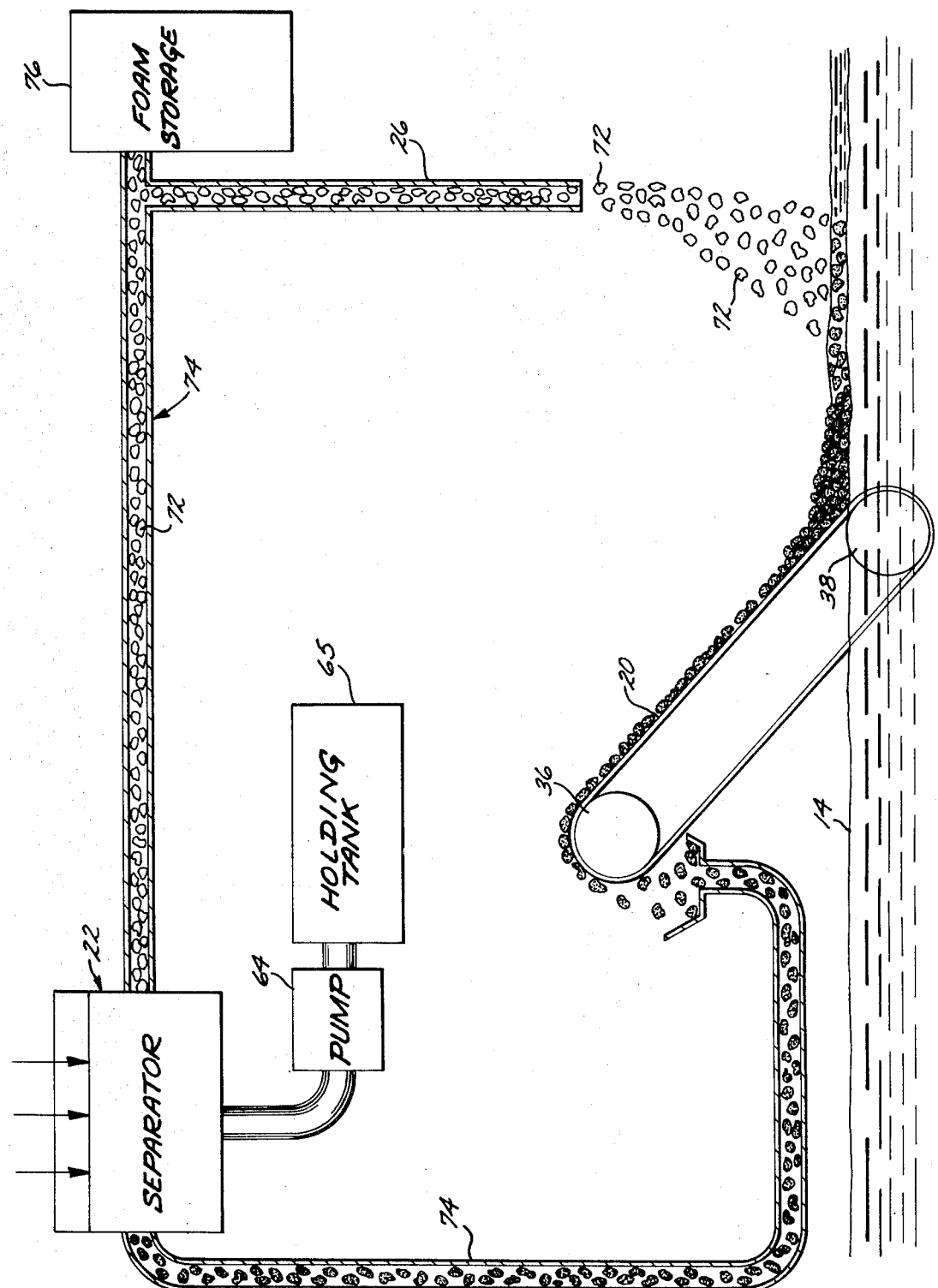
FIG. 3 is a diagrammatic showing of the operation of the apparatus of FIGS. 1 and 2, and broadly disclosing the sequence of operation of the apparatus of the present invention.

The oil-absorbing material utilized in conjunction with the present apparatus 10 is illustrated by the numeral 72 in FIG. 3. The material is in the form of a great plurality of relatively small cubes, chunks, bits, or bodies 72 which are open cell or porous, being characterized by a multiplicity of relatively fine capillary passages. The bodies 72 have a density which is less than water, both before and after absorbing any oil. Consequently, the bodies 72 always float upon the water surface 14, which is extremely desirable in order that absorption be confined to absorption of oil, rather than water. That is, any pronounced submersion of the bodies 72 beneath the surface of the water would subject the bodies 72 to a hydrostatic head which would tend to force water into the pores of the bodies along with, and perhaps in place of oil. Thus, the buoyancy of the bodies 72 results in no appreciable relative movement between the bodies and the water surface 14, even during conditions of extreme wave action.

As will be seen, the bodies 72 are necessarily resiliently flexible so that any absorbed oil can be extracted from the bodies 72 by compression of the bodies by the compressors 22.

The bodies 72 are made of a material which is generally hydrophobic and oleophilic so that it will have a tendency to reject water while exhibiting an affinity for oil. A suitable material for this purpose has been found to be flexible urethane or polyester foam having a density of approximately 2 pounds per cubic foot. The multiplicity of cells in this material are designated as a cell count of so many pores or cells per linear inch, and in the form of urethane foam material successfully utilized, the cell count was 27½ cells per linear inch. In practice this type of material has been found to preferentially separate normally liquid hydrocarbon compounds from a liquid of higher specific gravity such as water and, since the foam material floats upon the surface of the water the normal affinity of the material for oleaginous materials is not disturbed by the existence of any hydrostatic head, which would exist if, for example, the foam material were to be plunged below the water surface 14 by artificial skimming devices or the like. In fact, the bodies 72 of this foam material, when spread upon an oil-water mixture and thereafter removed and compressed, have yielded absorbed material which is 95 per cent fuel oil versus 5 percent or less of the water. Apparently the hydrophobic character of the foam material allows oil to readily displace any water which may be in close proximity to the surface of the foam bodies 72. However, even when the foam material is completely saturated with oil, it will still float upon the water surface 14, which is important to the present invention.

Other open cell, flexible materials may also be utilized for the bodies 72 so long as such materials have the described oleophilic and hydrophobic character, whether this is due to the number and size of the cells or pores, or whether it is due to some other factors, such as a chemical coating or the like upon a base material.

As best viewed in FIG. 3, the apparatus of the present invention basically requires only a conveyor system, generally designated 74 which is effective to lift the oil saturated foam bodies 72 from the water surface 14, such as by means of the conveyors 20, deliver the bodies 72 to a foam-oil separator, such as the compressors 22 and, finally, redistribute the relatively oil-free bodies 72 back upon the water surface 14, as by means of the distributors 26. Preferably some form of reservoir or storage container 76 is provided to compensate for any foam bodies 72 which are not recovered by the conveyors 20. In addition, suitable pumping equipment (not shown) would be provided for transferring the oil collected in the holding tank or bunkers 65.

In operation, the vessel platform 12 is moved forward through the water on which the oil slick is located and foam bodies 72 are distributed through the distributors 26 upon the water surface 14. The bodies 72 absorb oil on the water surface 14 and, relative to the platform 12, move rearwardly between the hull and the interior surface plates 30 of the booms 16. In this convergent pair of collection areas on opposite sides of the vessel platform 12, the foam bodies 72 encounter the continuously moving conveyors 20, which lift the oil-saturated bodies 72 from the water surface. The bodies 72 are next carried by the conveyors 46 into the compressors 22, where the entrapped oil is extracted. As will be apparent, this occurs because of the progressively decreasing volume defined by the changing pitch of the helical screws of the compressors 22. The recovered oil is collected in the ship's bunkers 65, and the relatively oil-free foam bodies 72 are carried forward for discharge upon the water surface 14 by means of the pair of distributors 26. As previously indicated, the oil coating on the recirculated foam bodies 72 enhances the wetting effect or oleophilic character of the foam bodies 72, further increasing the efficiency of the oil absorption process.

From the foregoing it will be apparent that the present apparatus provides the following desirable features: high oil recovery rate, minimum inclusion of water with the removed oil, efficient oil removal in the presence of water motion or wave action, relatively inexpensive to fabricate, and relatively easy to deploy and maintain.

Various modifications and changes may be made with regard to the foregoing detailed description without departing from the spirit of the invention.

I claim:

1. Apparatus for separating oil from a water surface, said apparatus comprising:
   a floating platform;
   distribution means on said platform for depositing floating bodies of oil absorbent, resiliently compressible material upon said water surface;
   material-compressing means on said platform for receiving oil soaked said bodies and for compressing said bodies to remove oil therefrom;
   conveyor means for lifting said floating bodies from said water surface and transporting said bodies to said material-compressing means; and
   recycling means including conduit means for transferring said bodies from said material-compressing means to said distribution means.

2. Apparatus according to claim 1 and including boom means inwardly pivotable upon said platform for compact stowage, said boom means having floats adjacent the free extremities thereof for moving said booms in conformity with any wave action of said water surface.

3. Apparatus according to claim 2 wherein said boom means define with said platform a convergent area constituting a collection area for said floating bodies.

4. Apparatus according to claim 3 wherein said boom means comprise a pair of booms extending outwardly from opposite sides of said platform, said distribution means are operative to distribute said floating bodies forwardly of said collection area for floating movement into said collection area.

5. Apparatus according to claim 1 wherein said material-compressing means include a helical screw conveyor having a progressively decreasing screw pitch whereby said foam bodies are compressible upon passage therethrough.

6. Apparatus for removing oil spills from the surface of a body of water, said apparatus comprising:
   a floating platform adapted for movement through said body of water;
   distribution means on said platform operative to broadcast discrete floating bodies of oil absorbent material upon said water surface in the path of movement of said platform relative to said water surface;
   conveyor means operative to skim said water surface and lift the oil-soaked said floating bodies therefrom;
   oil-separating means on said floating platform adjacent said conveyor means and operative to receive the lifted said oil-soaked bodies from said conveyor means, and further operative to effect separation of oil therefrom; and
   recycling means including conduit means for transporting the substantially oil-free said bodies from said oil-separating means to said distribution means for rebroadcasting upon said water surface.